US012578490B2

(12) United States Patent
Kreisler et al.

(10) Patent No.: US 12,578,490 B2
(45) Date of Patent: Mar. 17, 2026

(54) RECALIBRATION OF A RADIATION DETECTOR

(71) Applicant: Siemens Healthineers AG, Forchheim (DE)

(72) Inventors: Bjoern Kreisler, Hausen (DE); Florian Wolz, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 0 days.

(21) Appl. No.: 18/959,771

(22) Filed: Nov. 26, 2024

(65) Prior Publication Data

US 2025/0172712 A1 May 29, 2025

(30) Foreign Application Priority Data

Nov. 28, 2023 (DE) ..................... 10 2023 211 882.3

(51) Int. Cl.
*G01T 7/00* (2006.01)

(52) U.S. Cl.
CPC ................................... *G01T 7/005* (2013.01)

(58) Field of Classification Search
CPC .. G01T 7/00; G01T 7/005; G01T 1/20; G01T 1/2018; G01T 1/2985; G01T 1/2992; G01T 1/36; G01T 1/362; A61B 6/4233; A61B 6/582; A61B 6/03; A61B 6/4241; A61B 6/482; G01N 2223/303
See application file for complete search history.

(56) References Cited

U.S. PATENT DOCUMENTS

| | | |
|---|---|---|
| 2008/0048126 A1 | 2/2008 | Janssen et al. |
| 2011/0012014 A1 | 1/2011 | Livne |
| 2011/0233394 A1 | 9/2011 | Glasser |
| 2013/0214144 A1 | 8/2013 | Hannemann et al. |
| 2014/0105370 A1 | 4/2014 | Yamakawa |
| 2014/0185781 A1 | 7/2014 | Reitz et al. |
| 2016/0113603 A1 | 4/2016 | Schirra et al. |
| 2017/0285186 A1 | 10/2017 | Roessl et al. |
| 2024/0230934 A1 | 7/2024 | Burr et al. |

FOREIGN PATENT DOCUMENTS

| | | |
|---|---|---|
| DE | 102006022596 A1 | 11/2007 |
| DE | 102011080656 A1 | 2/2013 |
| DE | 102013200021 A1 | 7/2014 |
| DE | 102016219250 A1 | 4/2018 |

OTHER PUBLICATIONS

German Office Action and English translation thereof for German Application No. 10 2023 211 882.3 mailed Aug. 12, 2024.
German Decision to Grant and English translation thereof for German Application No. 10 2023 211 882.3 mailed Nov. 15, 2024.

*Primary Examiner* — Jurie Yun
(74) *Attorney, Agent, or Firm* — Harness, Dickey & Pierce, P.L.C.

(57) ABSTRACT

A method for calibration of a radiation detector with a plurality of pixels is described. In the method, the radiation detector is recalibrated via recalibrated signal threshold value-signal energy value pairs. A recalibration facility is also described. Moreover, a radiation detector and an imaging system are described.

20 Claims, 6 Drawing Sheets

RECALIBRATION OF A RADIATION DETECTOR

CROSS-REFERENCE TO RELATED APPLICATION(S)

The present application claims priority under 35 U.S.C. § 119 to German Patent Application No. 10 2023 211 882.3, filed Nov. 28, 2023, the entire contents of which are incorporated herein by reference.

FIELD

One or more example embodiments relates to a method for recalibration of a radiation detector with a plurality of pixels. Furthermore, one or more example embodiments relates to a calibration facility. Moreover, one or more example embodiments relates to a radiation detector. In addition, one or more example embodiments relates to an imaging system.

RELATED ART

With the aid of modern imaging methods, two- or three-dimensional image data is frequently generated which can be used for the visualization of a mapped examination object and also for further applications, moreover. In order to obtain items of image information from an examination object, systems are frequently used which are based on the detection of electromagnetic waves which are interacting with the examination object.

One possibility for obtaining image data from inside such an examination object is based on X-ray imaging technology. An X-ray system used for this purpose comprises an X-ray source for generating X-ray radiation and an X-ray detector for detection of the X-ray radiation. The X-ray detector comprises a detection unit which generates a detection signal for X-ray radiation striking the detection unit, and an evaluation unit which ascertains a set of count rates for X-ray radiation striking the detection unit on the basis of the detection signal.

In order to obtain three-dimensional data from an examination object, a computed tomography system (referred to as a CT system for short) is frequently used with which projection measurement data is acquired from the examination object. In CT systems, a combination, arranged on a gantry, of X-ray source and X-ray detector arranged opposite customarily revolve around a measuring room in which the examination object (which will be referred to hereinafter as the patient without limiting the generality) is situated. The rotation center (also called "isocenter") coincides in this case with what is known as a system axis z. On one or more revolutions the patient is radiographed with X-ray radiation of the X-ray source, with projection measurement data or X-ray projection data being detected with the aid of the opposing X-ray detector.

The projection measurement data which is generated is dependent, in particular, on the design of the X-ray detector. X-ray detectors customarily have a plurality of detection units which are usually arranged in the form of a regular pixel array. For X-ray radiation striking the detection units, the detection units in each case generate a detection signal which is analyzed at particular instants with regard to intensity and spectral distribution of the X-ray radiation in order to draw conclusions about the examination object and to generate projection measurement data.

Recently, what are known as quantum-counting X-ray detectors are used for the detection of the projection measurement data. With such quantum-counting or photon-counting X-ray detectors, the detection signal for X-ray radiation is analyzed with regard to the intensity and the spectral distribution of the X-ray radiation in the form of count rates. The count rates are provided as output data of what is known as a detector channel which is assigned to one detection unit respectively. In quantum- or photon-counting detectors with a plurality of energy thresholds, each detector channel usually generates a set of count rates per projection on the basis of the respective detection signal of the detection unit. The set of count rates can comprise count rates for a plurality of different, in particular simultaneously checked energy threshold values. The energy threshold values and the number of energy thresholds, to which one energy threshold value respectively is assigned, are usually specified as the signal analysis parameters for detecting the projection.

The control and signal analysis in an evaluation unit of such an X-ray detector is performed by externally supplied register values which are converted via digital-to-analog converters (DAC for short) into control voltages. In this connection, a digital setting will hereinafter also be referred to as the DAC value for short or signal threshold value which indicates the control function by citing the detector parameter. For example, control voltages respectively of the X-ray detector, which define electronic thresholds of comparators in the signal evaluation unit, correspond to the DAC values. Energy threshold values in turn correspond to the electronic thresholds of the comparators, for example electrical voltage values, with the aid of which values incident X-ray quanta can be measured and differentiated with regard to their energy. The energy threshold values define a range of energy values in which a comparator detects X-ray quanta and the X-ray quantum is thereby counted. Per channel, X-ray detectors conventionally have a plurality of electronic thresholds which are actuated with different DAC values or signal threshold values. To be able to measure the energy of the incident X-ray quanta absolutely, an absolute energy scale has to be calibrated. That is to say, a correlation between the electronic signal threshold values of the comparators and the energy threshold values corresponding to them has to be ascertained for incident X-ray quanta, from which a signal energy value can be ascertained. An assignment of the measured signal threshold value to a signal energy value consequently takes place with a measurement of X-ray quanta on the basis of knowledge of said correlation and on the basis of knowledge of the measured signal threshold value.

Conventionally, a calibration, also referred to as tuning, is customarily carried out for this purpose as early as during manufacture of an X-ray detector or a CT system with such an X-ray detector during an initial tuning. Furthermore, in order to improve the accuracy an X-ray detector also has to be recalibrated if needed after delivery to the customer.

However, the settings of the energy thresholds, or of the electronic thresholds corresponding to the energy thresholds, in fixed steps, the DAC values or signal threshold values, are only possible with a certain level of granularity. One DAC can correspond, for example, to an energy level of 0.5 keV. Therefore, the electronic thresholds cannot be exactly adjusted and instead a binning or rounding to full integer values takes place before creating the final tables. If the sensor signals change minimally over time, this setting can be updated or optimized.

SUMMARY

If image quality artifacts occur which point to a spectral change in the X-ray detector, a complete retuning is customarily carried out. However, such a process requires a great deal of time, for example a full working day, during which a technician is working on the equipment and the equipment cannot be used by a radiologist.

Furthermore, noise effects often hinder an exact ascertainment of the characteristic structures of a characteristic X-ray spectrum. Owing to said noise effects a certain quantity of pixels is customarily combined for the spectral fine adjustment since only combining and averaging over a plurality of pixels allow the spectral structures to be identified.

With such a retuning, the energy thresholds, or the electronic thresholds assigned to the energy thresholds, are completely re-measured and set to a defined value. However, the measurement and evaluation noise, including rounding/sampling errors, is fully incorporated in the tables by way of this step. Therefore all subsequent tuning tables also lose their validity and have to be adjusted accordingly.

One or more example embodiments provides a method for calibration of radiation detectors, in particular X-ray detectors in CT systems, which is less complex and, in particular, less time-consuming than the customary methods for calibration of a radiation detector.

BRIEF DESCRIPTION OF THE DRAWINGS

One or more example embodiments will be explained in more detail below with reference to the accompanying Figures using exemplary embodiments. Similar components are provided with identical reference numerals in the various Figures.

In the drawings.

DETAILED DESCRIPTION

Figure 1:
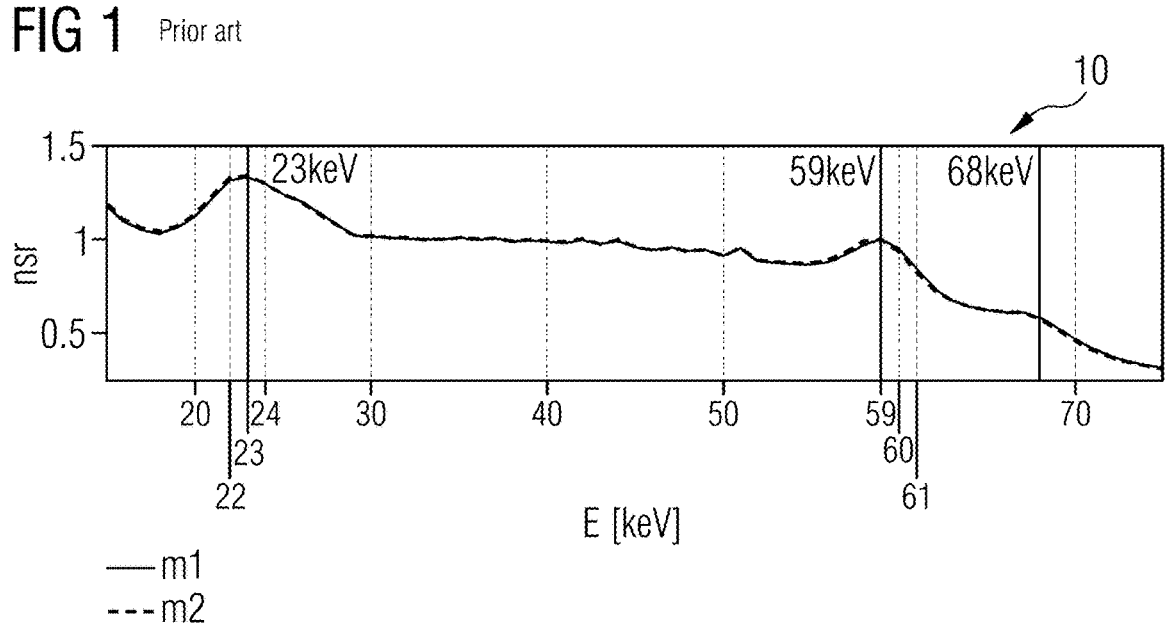
FIG. 1 shows a graph which illustrates a drift of an X-ray detector using the example of the measurement of a characteristic X-ray spectrum of an X-ray source.

In the inventive method for recalibration of a radiation detector with a plurality of pixels, firstly a radiation spectrum of a radiation source, preferably an X-ray spectrum, particularly preferably a characteristic X-ray spectrum of an X-ray source, is detected by the radiation detector. The radiation spectrum represents the energy distribution of the radiation emitted by radiation source. It is important in this connection that the radiation spectrum used in the recalibration is as similar as possible to an earlier radiation spectrum which was measured during a preceding calibration or recalibration and which earlier radiation spectrum and its assigned calibration or recalibration is used as a reference for the current recalibration. The high degree of similarity can be achieved by way of an identical actuation of the radiation source during the reference measurement and the current recalibration. In this connection, a radiation detector should be taken to mean a facility that detects electromagnetic waves or particle radiation. The radiation source, which is used in the recalibration, should therefore be, in particular, the same as the radiation source which was used in the earlier calibration.

A plurality of energy-dependent count rates for different signal threshold values or electronic threshold values of an evaluation unit of the radiation detector is measured per pixel of the radiation detector during the recalibration measurement, and updated signal threshold value-count rate pairs are ascertained on the basis of the measured count rates and the signal threshold values or DAC values assigned to them.

These DAC values or signal threshold values are threshold values of electronic thresholds of digital-to-analog converters which generate digital values on the basis of sensor signals. A shift of the signal threshold values of the updated signal threshold value-count rate pairs relative to the earlier signal threshold values of the reference signal threshold value-count rate pairs is now mathematically ascertained by way of a comparison of the updated signal threshold value-count rate pairs with the reference signal threshold value-count rate pairs of a previous reference measurement which preferably comprises a complete calibration.

In addition to the signal threshold value-count rate relationship characterized by the reference signal threshold value-count rate pairs, the previous reference measurement is also a signal energy value-signal threshold value relationship with a reference signal energy value and assigned to a reference signal threshold value. The latter relationship may be deduced on the basis of the signal threshold value-count rate relationship and knowledge of characteristic properties of the radiation spectrum underlying the reference measurement.

As explained in more detail later, the shift in the signal threshold values is preferably firstly ascertained as a continuous value for a correction of the signal energy value-signal threshold value relationship of the reference measurement. The thus ascertained corrected signal energy value-signal threshold value relationship is rounded to discrete DAC values or signal threshold values only at the conclusion of the recalibration.

Pixel-individual shift values for the signal threshold values are therefore ascertained pixel-wise by way of a comparison of the updated pixel-individual signal threshold value-count rate pairs with pixel-individual reference signal threshold value-count rate pairs, ascertained at an earlier instant, of a preceding calibration of the radiation detector.

Finally, recalibrated signal threshold values are ascertained by way of pixel-wise addition of the respective pixel-individual shift value to the signal threshold values of the respective pixel-individual allocations between reference signal threshold value and reference signal energy value of the respective pixel. In other words, recalibrated signal threshold value-signal energy value pairs are ascertained by way of pixel-wise addition of the respective pixel-individual shift value to signal threshold values of respective pixel-individual reference signal threshold value-signal energy value pairs of the respective pixel of the preceding calibration.

Furthermore, the radiation detector is recalibrated via the recalibrated signal threshold value-signal energy value pairs. During the course of the recalibration, signal threshold value-signal energy value pairs stored in the data storage of the radiation detector are changed on the basis of the ascertained signal threshold value-signal energy value pairs and provided for the correction of future measurements.

Advantageously, the reference signal threshold values of the pairs ascertained during the original calibration from signal threshold values and signal energy values can be corrected pixel-wise without the signal energy values having to be redetermined. Since the ascertained shift in the signal threshold values is, as a rule, very low, the respective signal threshold value does not change in the case of most pixels owing to the rounding of the signal threshold values to integer values. The assignment between rounded signal threshold value and signal energy value only has to be changed in the case of pixels in which the shift causes a change in a rounded signal threshold value. These are usually pixels in which a non-rounded signal threshold value is very close to a rounding threshold.

The effort of recalibration compared to a complete new calibration is consequently reduced since the signal energy values do not have to be measured again and signal threshold values, i.e. DAC values, rounded for each pixel do not have to be changed.

Furthermore, the recalibration can occur without a detailed analysis of the detected count rate spectrum with regard to distinctive spectral lines and their assigned energy values because such an analysis is usually impeded by severe noise effects, so a customary new calibration is connected with an increased level of uncertainty when defining the individual energy thresholds, or the signal threshold value-signal energy value pairs. Usually, a plurality of pixels is combined in the case of a customary calibration and the energy thresholds or signal threshold value-signal energy value pairs are jointly defined for them, in order to reduce said noise effects and to some extent reliably ascertain the distinctive spectral lines. Advantageously, in contrast to a customary new calibration, a pixel-wise correction can occur with the inventive procedure and said noise effects can be suppressed since said items of spectral information are not now required in order to carry out the recalibration. The recalibration can therefore take place with increased detector resolution compared to the customary approach. Owing to the increased resolution of the exact detection of the X-ray radiation, the image quality of a radiation detector, in particular of such an X-ray detector, recalibrated using the inventive method can be improved overall.

The inventive recalibration facility for a radiation detector has a data receiving interface for detecting a radiation spectrum of a radiation source, preferably an X-ray spectrum of an X-ray source, of the radiation detector. A plurality of energy-dependent count rates for different signal threshold values of an evaluation unit of the radiation detector is received per pixel of the radiation detector, and updated signal threshold value-count rate pairs are ascertained on the basis of the different signal threshold values and the count rates assigned to them.

A comparison unit for the pixel-wise ascertainment of pixel-individual shift values for the signal threshold values by way of a comparison between the updated signal threshold value-count rate pairs and the pixel-individual reference signal threshold value-count rate pairs, ascertained at an earlier instant, of a preceding calibration of the radiation detector is also part of the inventive recalibration facility.

The inventive recalibration facility also has a recalibration unit for the pixel-wise ascertainment of recalibrated signal threshold value-signal energy value pairs by way of pixel-wise addition of the respective pixel-individual shift value to signal threshold values of respective pixel-individual reference signal threshold value-signal energy value pairs of the respective pixel of the preceding calibration and for recalibration of the radiation detector via the recalibrated signal threshold value-signal energy value pairs. The inventive recalibration facility shares the advantages of the inventive method for recalibration of a radiation detector with a plurality of pixels.

The inventive radiation detector, preferably an X-ray detector, has a detection unit which generates a detection signal for radiation striking the detection unit, in particular X-ray radiation. The inventive radiation detector also has an evaluation unit which ascertains a set of measured values for X-ray radiation striking the detection unit on the basis of the detection signal. The measured values can relate, for example, to count rates of counting events detected with the aid of the radiation detector. They can also relate to time intervals between individual counting events, count values, intensity values or photon rates in a detector pixel. The set of measured values usually comprises, as mentioned in the introduction, a plurality of count rates which are simultaneously ascertained for an individual detector channel. The count rates simultaneously ascertained for an individual detector channel, in particular for a plurality of energy thresholds, are ascertained with respectively assigned mutually different energy threshold values. In addition, the inventive radiation detector also comprises an inventive recalibration facility.

Such a radiation detector can be embodied, for example, as a quantum-counting or photon-counting X-ray detector. Said detection unit of the inventive X-ray detector can in this case comprise, in particular, a detection area in order, for example, to generate charge pulses as the detection signal for X-ray radiation absorbed by the detection unit. The detection signal and, in particular, the charge pulses are thus suitable, in particular, for determining the energy of the absorbed X-ray radiation.

The evaluation unit can, in particular, be integrated in what is known as an ASIC (Application Specific Integrated Circuit) or be implemented in the structural form of an ASIC. In particular, the detection unit and at least some of the evaluation unit can be incorporated in said detector channel. The inventive radiation detector shares the advantages of the inventive recalibration facility.

Inventively, an imaging system, preferably an X-ray imaging system, in particular a CT system, is also proposed, with a radiation source, preferably an X-ray source for emitting X-ray radiation, and an inventive radiation detector, preferably an X-ray detector, for detecting the radiation emitted by the radiation source. The inventive imaging system shares the advantages of the inventive radiation detector.

The majority of the above-mentioned components of the inventive recalibration facility can be implemented wholly or partially in the form of software modules in a processor of a corresponding computing system, for example of a control facility of a radiation detector or an imaging system with such a radiation detector. This relates, in particular, to the comparison unit and the recalibration unit. An implementation largely in terms of software has the advantage that even previously used computing systems can be easily retrofitted by way of a software update in order to work inventively. In this regard the object is also achieved by a corresponding computer program product with a computer program which can be loaded directly into a computing system, with program segments in order to execute the steps of the inventive method, at least the steps which can be executed by a computer for pixel-wise ascertainment of pixel-individual shift values, for pixel-wise ascertainment of recalibrated signal threshold value-signal energy value pairs and for recalibration of the radiation detector via the recalibrated signal threshold value pairs when the program is executed in the computing system. Apart from the computer program, such a computer program product can optionally comprise additional integral parts, such as documentation and/or additional components, also hardware components, such as hardware keys (dongles, etc.) in order to use the software.

In particular, the inventive recalibration facility can be part of a user terminal or a control facility of an imaging system, preferably an X-ray imaging system, in particular a CT system.

A computer-readable medium, for example a memory stick, a hard disk or another transportable or permanently installed data carrier, can serve for transportation to the computing system or control facility and/or for storage on or in the computing system or the control facility, on which medium the program segments of the computer program, which can be read-in and executed by a computing system, are stored. The computing system can have one or more cooperating microprocessor(s) or the like for this purpose.

Further, particularly advantageous embodiments and developments of the invention can be found in the dependent claims and the following description, with it being possible to also develop the independent claims of one category of claims analogously to the dependent claims of a different category of claims.

In one embodiment of the inventive method, the radiation detector comprises one of the following types of detector:

an X-ray detector, a quantum-counting X-ray detector, a photo detector.

Advantageously, the inventive method can be applied to different types of radiation detectors. However, it is particularly preferred to apply the inventive method to a quantum-counting X-ray detector.

In a preferred embodiment of the inventive method for recalibration of a radiation detector with a plurality of pixels, the pixel-individual shift values are ascertained pixel-wise on the basis of one of the following types of comparison method:

a regression analysis is carried out on the basis of the updated signal threshold value-count rate pairs and the pixel-individual reference signal threshold value-count rate pairs, ascertained at an earlier instant, of a preceding calibration of the radiation detector, a method based on artificial intelligence is applied to the updated signal threshold value-count rate pairs and the pixel-individual reference signal threshold value-count rate pairs, ascertained at an earlier instant, of a preceding calibration of the radiation detector.

Advantageously, statistical errors, in particular noise effects, can be reduced by adding the entire signal threshold value scale or DAC value scale for ascertaining the shift.

In one embodiment of the inventive method for recalibration of a radiation detector with a plurality of pixels, the pixel-individual shift values each comprise an offset value. The offset value is added during the step of pixel-wise ascertainment of recalibrated signal threshold value-signal energy value pairs to signal threshold values of respective pixel-individual reference signal threshold value-signal energy value pairs of the respective pixel of the previous calibration. Such a recalibration corresponds to a recalibration of the zeroth order, which can be carried out particularly easily and with little effort.

If the recalibration should be even more accurate, then it can also take place in a higher order than said zeroth order. A best-fit curve between the signal threshold values ascertained during the recalibration and the reference signal threshold values of an earlier calibration respectively assigned to them are ascertained. The shift values result on the basis of the ascertained parameter values of the best-fit curve and are optionally dependent on the respective signal threshold values. The best-fit curve preferably comprises a polynomial of a higher order than the zeroth order.

For example, during a recalibration in the first order the updated, recalibrated pixel-based shift values are each calculated from an offset value and a change in a gradient of a line of best fit preferably ascertained during a regression analysis. The line of best fit reproduces the relationship between the signal threshold values measured during the recalibration and the signal threshold values of the reference measurement or earlier calibration.

The change in the gradient of the lines of best fit results from the change in their gradient compared to a reference value, preferably the value 1. A shift value results as the sum of the offset value and a product of the change in the gradient of the ascertained line of best fit and a signal threshold value of a reference signal threshold value-count rate pair. Advantageously, the accuracy of the recalibration is improved further owing to consideration of the change in the gradient compared to a recalibration of the zeroth order at which only the offset value is taken into consideration.

The ascertained shift can be applied to a plurality of different calibration tables which are based on signal threshold values, during the step of recalibration via the recalibrated signal threshold value-signal energy value pairs. This is also possible, in particular, because, in contrast to a complete new calibration, no new noise effects are generated during recalibration. As subsequently explained in detail, apart from the energy adjustment table, which reproduces an assignment between signal threshold values and signal energy values or supplies correction values for this assignment, there are also calibration tables of a different type which are based on signal threshold values and supply corrections for measured values of radiation detectors. Advantageously, the effort of recalibration during recalibration of a plurality of calibration tables of a different type is therefore particularly significantly reduced compared to a respective complete new calibration of these calibration tables.

The different calibration tables preferably comprise at least one of the following types:

an energy adjustment table, a linearity correction table, an offset correction table, a gain correction table, a defective pixel correction table, a hardening correction table.

An energy adjustment table comprises the relationship between DAC values, i.e. signal threshold values, and signal energy values already described in the introduction.

A linearity correction table serves to correct what are known as pileup effects and general non-linear effects of the measuring scale. Pileup effects relate to the measurement of events, which occur within so short a time that they are not or are hardly perceived as individual events. This results in a counting loss.

An offset correction table enables a zero point correction of pixel-individual differences in the measurement of X-ray radiation.

A gain correction table enables a scaling correction of pixel-individual differences in the measurement of X-ray radiation.

A defective pixel correction table enables an identification of inadequate functional pixels for which interpolation values are generated as a substitute.

A hardening correction table allows a spectral, pixel-individual correction for physical properties in the measuring object.

Advantageously, the shift values can each be applied to the different calibration tables. The individual tables therefore do not have to be calibrated or tuned again individually by a separate calibration measurement. The inventive method consequently saves a considerable amount of time and considerably reduces the measuring and computing effort in the case of a correspondingly high number of different calibration tables.

In a preferred embodiment of the inventive method for recalibration of a radiation detector with a plurality of pixels, the pixel-individual reference signal threshold value-count rate pairs are assigned to a continuous reference signal threshold value scale and have continuous reference signal threshold values.

In order to ascertain the recalibrated signal threshold values, the ascertained pixel-individual shift value is added to the continuous reference signal threshold values, with continuous signal threshold values being generated, and recalibrated signal threshold values of the recalibrated signal threshold value-count rate pairs are ascertained by rounding the continuous signal threshold values in each case to an integer signal threshold value or DAC value.

Preferably therefore, only the pixels whose previously calibrated signal threshold value is close to a value which lies at an odd-numbered multiple of half of a previously defined increment on the scale of the signal threshold values are corrected. For example, this increment can lie at the value 1. A correction only takes place when a recalibrated rounded signal threshold value undershoots or overshoots the rounding limit of 0.5, 1.5, 2.5 etc., i.e. the signal threshold value to be rounded is close to an odd-numbered multiple of half of the increment or due to the recalibration, a rounding to a different multiple of this value than in the case of the previous reference signal threshold value takes place.

Consequently, the shift is firstly applied to a continuous scale and during adjustment is rounded on a "DAC scale" with integer DAC values. The inventive method also functions on a continuous scale, however.

If the inventive method is carried out multiple times at different instants and if the continuous signal threshold values are stored with each recalibration, a trend analysis is thus preferably subsequently carried out on the basis of the continuous signal threshold values ascertained at different instants, on the basis of which analysis updated, recalibrated signal threshold value-signal energy value pairs can be approximate ascertained even without carrying out the inventive method again. Advantageously, the effort of recalibration is reduced further.

The instant at which the inventive method for recalibration has to be carried out again is likewise preferably ascertained on the basis of the trend analysis. If the shift overshoots, for example, a predetermined threshold value, then a renewed recalibration should be carried out with the inventive method. Such an instant can accordingly be estimated in advance by way of the trend analysis, so the number of recalibrations is limited to a minimum number and the calibration effort is thus reduced further.

To obtain particularly reliable calibration results, a validation of the inventive recalibration is preferably carried out on the basis of at least one error criterion, preferably on the basis of a plurality of such error criteria. The error criterion or the error criteria is/are ascertained on the basis of the measurement carried out for recalibration.

On the basis of the validation it is possible, in particular, to establish that when an excessively pronounced shift occurs, there is no recalibration or only a partial recalibration of selected pixels. An excessively pronounced shift should optionally be regarded as a reason to carry out a complete re-tuning. Advantageously, the recalibration can be purposefully applied to cases in which it constitutes an improvement to the previous calibration.

Preferably, the at least one error criterion comprises at least one of the following types of criteria:

a shift value occurs which overshoots a predetermined threshold value, a number of pixels, for which recalibrated signal threshold value-signal energy value pairs have to be generated, overshoots a predetermined maximum share of the total number of pixels of the radiation detector, a number of pixels rated as defective overshoots a predetermined maximum number.

The predetermined threshold value of the shift depends on the granularity of the signal threshold value scale used. The predetermined threshold value of the shift with a granularity of 0.5 keV is, for example, preferably two DAC values.

The preceding examination takes place in an alternative embodiment by way of an AI-based method (AI stands for "Artificial Intelligence" here). Advantageously, different criteria can be taken into account in a particularly individually adjusted manner.

If the result of the validation is negative, a warning message is preferably output. Advantageously, a user is informed that no recalibration has taken place and is warned about a possible deviation and inaccuracy of a measurement.

In a particularly advantageous variant of the inventive method, the different electronic thresholds of the same detector pixel are mapped to a common DAC scale, that is to say, electronic signal threshold value scale. In the case of X-ray detectors, a plurality of electronic signal thresholds can be assigned to a single pixel. These can be used to cover the entire bandwidth of the X-ray energy spectrum. If a common DAC scale were to be desired for all signal thresholds, the individual signal threshold value scales would thus have to be coordinated with each other. This can be implemented, for example, by way of shifting, compressing or lengthening the individual scales. Advantageously, all measured count rates of a detector pixel may be represented in a diagram in the case of such a common DAC scale. Advantageously, the common DAC scale can be brought into a correct relationship with an energy scale with the aid of the inventive method.

In a particularly effective variant of the inventive method, the detector pixels are divided into a first and a second group. The first group of the detector pixels is selected for the recalibration of the radiation detector. The detector pixels incorporated by the first group are selected in accordance with a certain sorting criterion, with which particularly suitable detector pixels are selected for the recalibration of the radiation detector. The remaining detector pixels then form the second group. Advantageously, the calibration is carried out on the basis of the suitable detector pixels, so a more exact result is achieved. The sorting criterion used can consist, for example, in that no detector pixels situated close to a scattered radiation grid or an edge of a sensor or a power supply cable are taken into account. The detector pixels assigned to the first group will also be referred to hereinafter as "clean" pixels, which do not experience shadowing since in this specific case they are not located close to a scattered radiation grid. The use of such a subgroup of the available pixels enables unaltered measured values to be ascertained, for example count values which, with the aid of the parameters obtained beforehand, enables the calibration of a signal threshold value scale with an energy scale. In this way the frequently occurring problem of a poorly oriented focal point or of the effect of potentially sub-optimally oriented collimators is solved.

Particularly preferably, ensembles of detector pixels with a sufficiently similar responsiveness of the individual detector pixels are formed for the recalibration. The ensembles of the detector pixels are preferably formed on the basis of a plurality of adjacent detector pixels with a sufficiently similar responsiveness of the individual detector pixels. Values based on a statistical evaluation of the ensembles are then used as input variables for the recalibration instead of the measured values of individual detector pixels.

For example, an ensemble average of the measured values of the individual detector pixels of the pixel group is assigned to an ensemble of detector pixels. The measuring signals of these pixels can be combined, for example by way of addition, in order to obtain an improved statistical significance compared to the measurement of an individual pixel. The grouping of the pixels in pixel groups significantly increases the signal-to-noise ratio of the measured values obtained during the test measurement and consequently improves the quality and reliability of the recalibration. In addition, the computing effort for the recalibration is lower due to the combining into pixel groups since the total number of sensor sub-units to be recalibrated is reduced compared to the recalibration of individual pixels.

The individual threshold values of the individual detector pixels can also be oriented to a common scale within the pixels of such a pixel group. Such an orientation is less sensitive to the limited statistics of the individual measured values of the underlying test measurement and consequently enables combining of the measured values of a pixel group in the first place.

In order to also take into account the detector pixels which do not form part of the first group of detector pixels, which therefore do not exhibit an approximately identical responsiveness, an alignment step is preferably carried out. This step is also known in the literature as a homogenization method. During the alignment step the responsiveness of the first and the second group of detector pixels is aligned with the responsiveness of the first group of detector pixels. Methods for aligning the detector pixels are described, for example, in DE 10 2006 022 596 A1 and in DE 10 2011 080 656 B4 to which reference is hereby made.

In conjunction with the inventive method, a balancing metric generated during the homogenization can be used for ascertaining the shift of the assignment between DAC values or signal threshold values and signal energy values since adjacent pixels presumably approximately in the first order have a similar shift and in a higher order have an additional pixel-individual shift component.

In the method described in DE 10 2006 022 596 A1 for aligning the responsiveness of detector pixels, a first measurement is carried out with radiation having a first energy spectrum, wherein a first energy threshold lying within the first energy spectrum exists for each detector pixel. The first count rates ascertained in the process for X-ray radiation below or above the first energy threshold are detected for each of the detector pixels. X-ray radiation with a second energy spectrum is subsequently emitted, wherein the first energy threshold remains unchanged. Second count rates for X-ray radiation below or above the first energy threshold are in turn detected for each of the detector pixels. A quotient is subsequently formed from the first count rate and the second count rate for each of the detector pixels. The first energy thresholds of the detector pixels are subsequently changed such that the quotients for the individual detector pixels are aligned. Advantageously, the recalibration measurement of the inventive method can now be simultaneously used to align the responsiveness of the detector pixels. Effort and time can consequently be saved in the inventive method owing to the dual use of the measurement data of the recalibration measurement.

To be able to execute the described alignment step of the detector pixels, the inventive method preferably comprises a measurement which is additional to the recalibration measurement and which is carried out with a photon flow spectrum different from the recalibration measurement. This second measurement then corresponds to the described measurement with a second energy spectrum within the context of the alignment method described in DE 10 2006 022 596 A1.

The inventive X-ray detector can comprise, in particular, a detection area or a detection surface which has a semiconductor material directly capturing or absorbing X-ray radiation (direct converter).

It is also conceivable that the inventive X-ray detector comprises a detection area with scintillator material which converts X-ray radiation to radiation in other, in particular visible, spectral ranges. The converted radiation can be detected with a semiconductor detector, for example a photodiode or a silicon photomultiplier, arranged so as to follow the scintillator in the radiation path and usually likewise incorporated in the detection unit. The photodiode, the silicon photomultiplier or the semiconductor detector then generates a detection signal which can likewise be analyzed with regard to the spectral distribution and intensity of the X-ray radiation detected by the scintillator.

FIG. 1 shows a graph 10 which illustrates a drift of an X-ray detector using the example of the measurement of a characteristic X-ray spectrum of an X-ray source. A first measuring curve m1, which shows a standardized spectral response nsr plotted against signal energy values E [keV], illustrates the measuring properties of the X-ray detector at a first instant, and a second measuring curve m2, which is shifted slightly in relation to the first measuring curve m1, illustrates the measuring properties of the X-ray detector at a second instant which is later than the first instant. A plurality of prominent energy values of the X-ray spectrum, such as 23 keV (fluorescence of the X-ray detector), 59 keV (fluorescence of the X-ray tube) and 68 keV, are also drawn in FIG. 1, to which values maximums are assigned in the graph of FIG. 1. These maximums or the energy values assigned to them can be used as orientation values in a conventional calibration. However, noise effects often impede an exact ascertainment of the maximums. Owing to said noise effects a certain quantity of pixels are conventionally combined for the spectral fine adjustment since only combining and averaging over a plurality of pixels can render the spectral structures illustrated in FIG. 1 visible.

Figure 2:
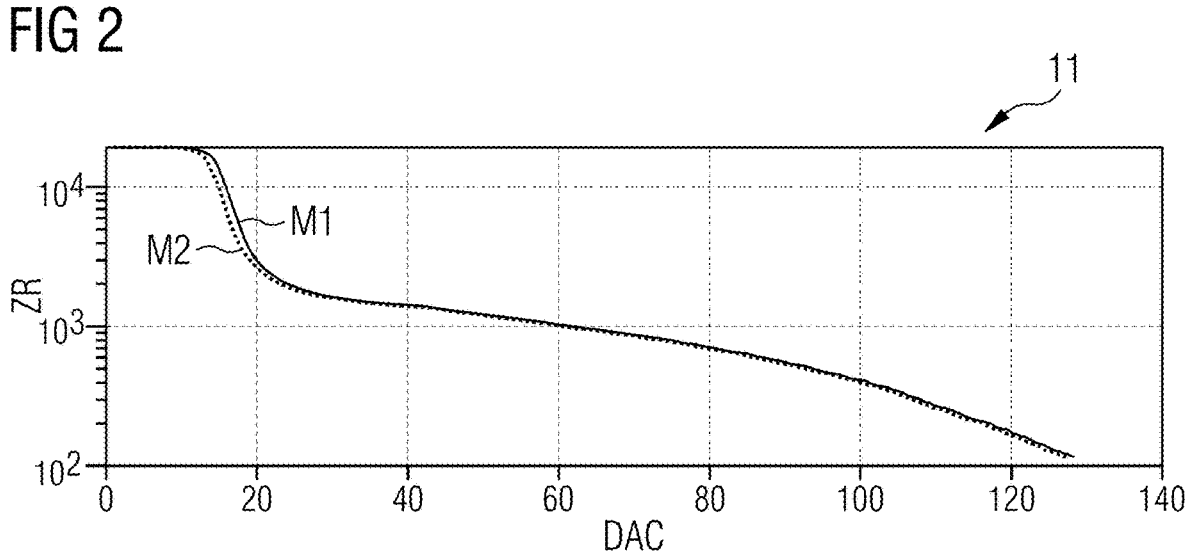
FIG. 2 shows a graph which illustrates a first and a second measuring curve of signal threshold value-count rate pairs which were recorded at different instants.

FIG. 2 shows a graph 11 which illustrates a first measuring curve M1 and a second measuring curve M2 of signal threshold value-count rates pairs which were recorded at different instants. It is easy to see that with the same count rate value ZR, there is a shift in the assigned signal threshold values DAC.

Figure 3:
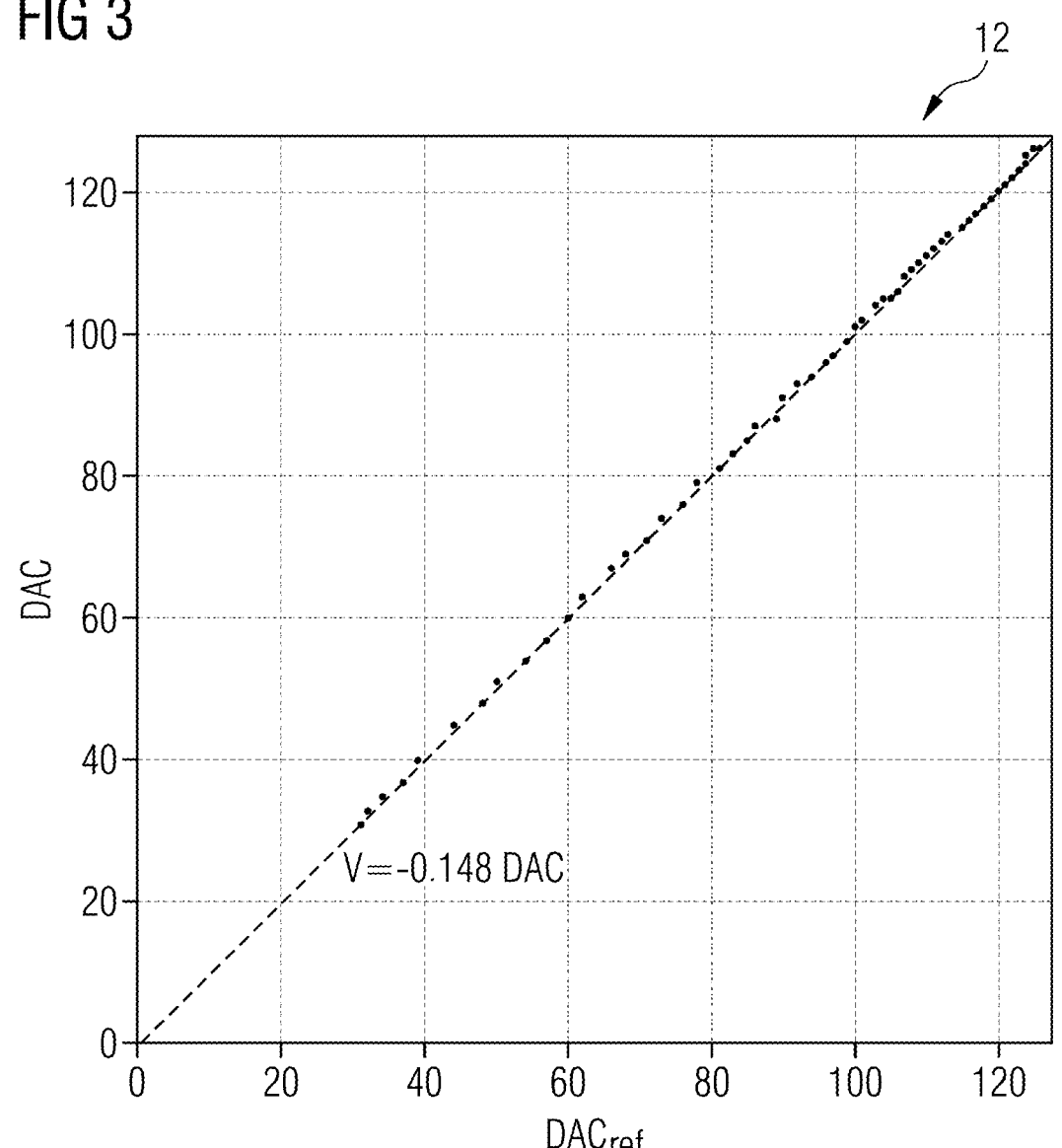
FIG. 3 shows a graph which illustrates updated signal threshold values plotted against reference signal threshold values.

FIG. 3 shows a graph 12 which illustrates updated signal threshold values DAC plotted against reference signal threshold values DACref. Figuratively speaking, the curves shown in FIG. 2 are slid over one another for this and DAC values or signal threshold values DACref, DAC assigned to the same count rates are compared with each other. The bisecting line symbolizes a shift-free mapping of the reference signal threshold values DACref to the updated energy threshold values DAC. As may be seen in FIG. 3, the new signal threshold values DAC in some cases deviate slightly from the reference signal threshold values DACref. Averaged in the zeroth order this deviation has a value V=−0.148 DAC. That is to say, the shift in the case of the recalibration is therefore −0.148 DAC values.

Figure 4:
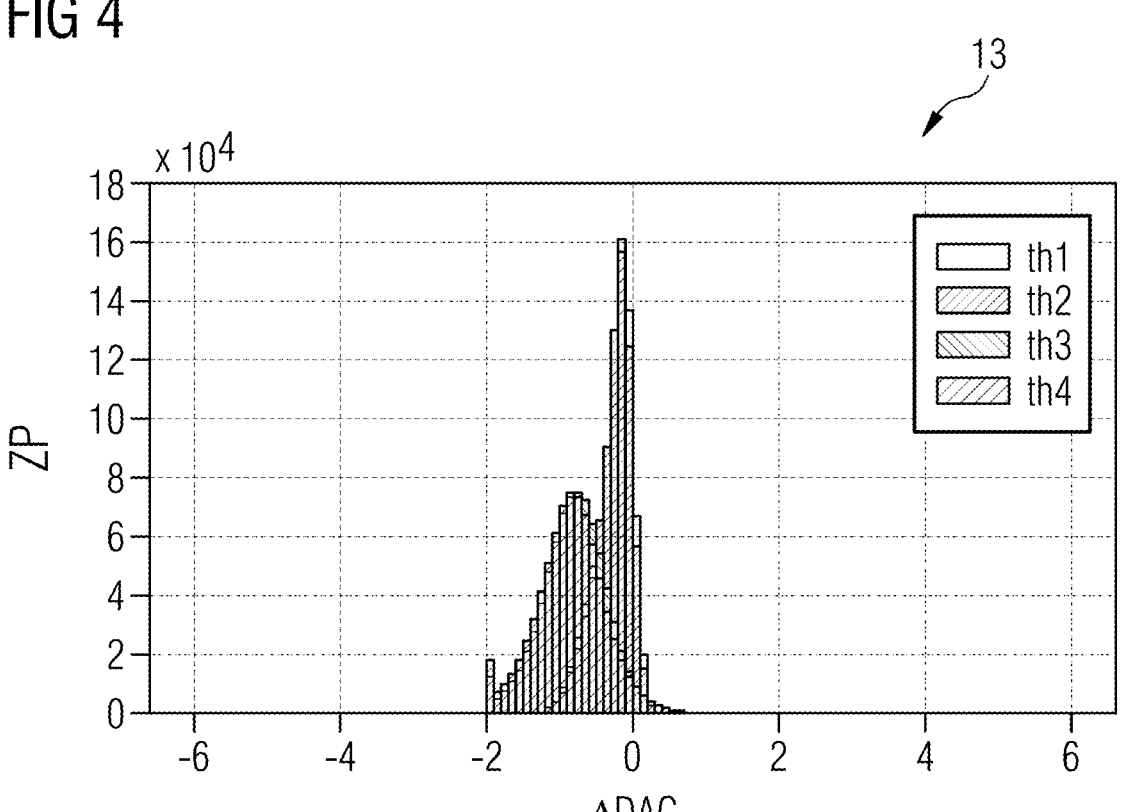
FIG. 4 shows a graph which shows distributions of pixels with shifts for four electronic energy thresholds for the zeroth order of the shifts.

FIG. 4 shows a graph 13 which illustrates distributions ZP of pixels P with shifts V or ΔDAC for four electronic energy thresholds th1, . . . , th4 for the zeroth order of the shifts V. The shifts are characterized by offset values which lie between −2 and +1.

Figure 5:
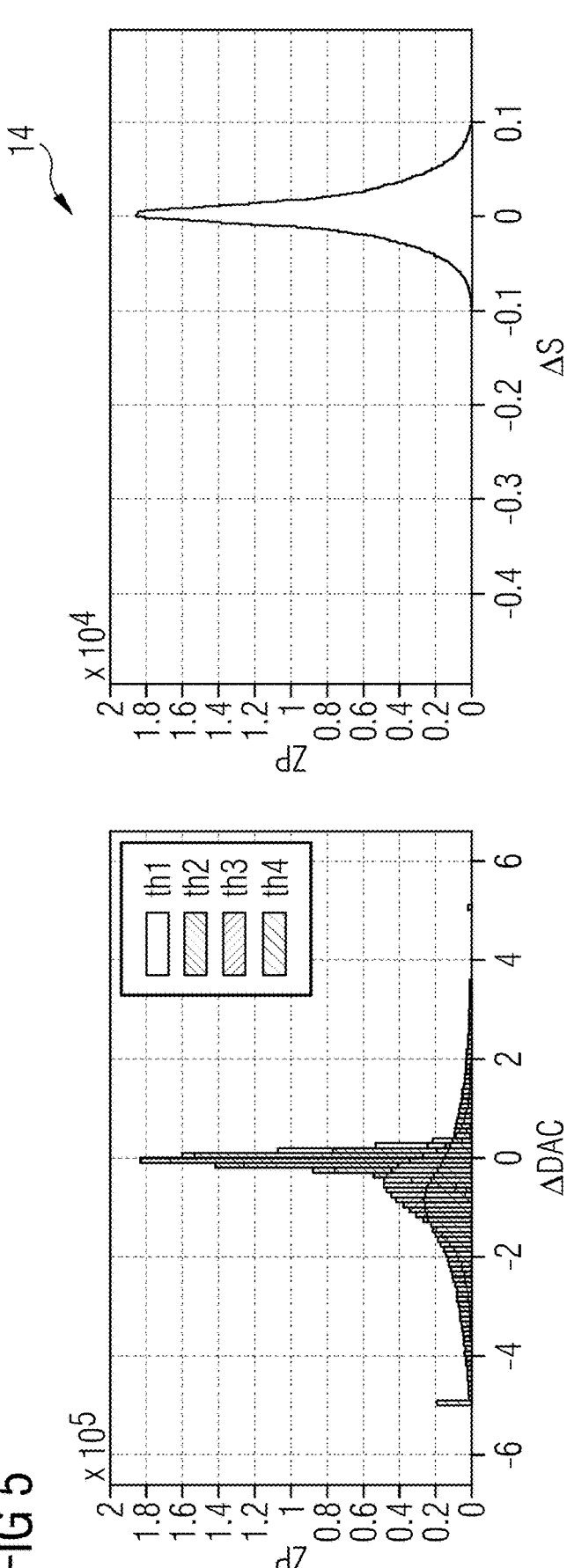
FIG. 5 shows a graph which represents distributions of pixels with shifts for four electronic energy thresholds for the first order of the shifts.

FIG. 5 shows a graph 14 which represents distributions ZP of pixels with shifts V or ΔDAC of the first to fourth energy thresholds th1, th2, th3, th4 for the first order of the shifts with two sub-graphs. Offset values of the shift V can be seen in the left sub-graph. The shifts are characterized by offset values which lie between −5 and +4. The right-hand graph in FIG. 5 represents a deviation ΔS in the gradient of a regression line between the reference energy threshold values DACref and the newly measured energy threshold values DAC.

Figure 6:
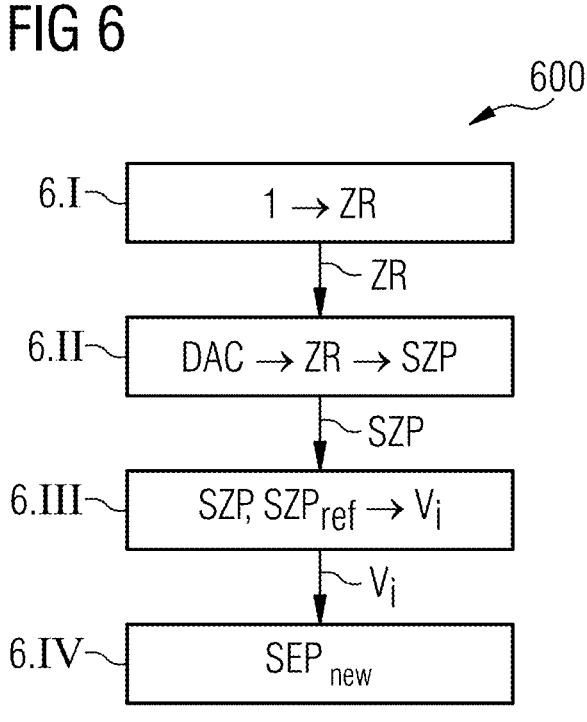
FIG. 6 shows a flowchart which illustrates a method for recalibration of a radiation detector with a plurality of pixels according to a first exemplary embodiment of the invention.

FIG. 6 shows a flowchart 600 which illustrates a method for recalibration of a radiation detector 1 with a plurality of pixels P according to a first exemplary embodiment of the invention.

In step 6.I, a characteristic X-ray spectrum of an X-ray source is detected by the radiation detector 1. A plurality of energy-dependent count rates ZR is measured for different signal threshold values DAC of an evaluation unit of the radiation detector 1 per pixel P of the radiation detector 1.

In step 6.II, updated signal threshold value-count rate pairs SZP are ascertained by assigning the signal threshold values DAC to spectral count rates ZR on the basis of knowledge of the characteristic X-ray spectrum.

In step 6.III, pixel-individual shift values Vi are ascertained pixel-wise for the signal threshold values DAC by way of a comparison between the signal threshold value-count rate pairs SZP with pixel-individual reference signal threshold value-count rate pairs SZPref, ascertained at an earlier instant, of a preceding calibration of the radiation detector 1 on the basis of a regression analysis.

In step 6.IV, recalibrated signal threshold value-signal energy value pairs SEPnew are ascertained by pixel-wise addition of the respective pixel-individual shift value Vi to the signal threshold values DACref of the respective pixel-individual reference signal threshold value-signal energy value pairs SEPref of the respective pixel Pi. Furthermore, the radiation detector 1 is recalibrated via the recalibrated signal threshold value-signal energy value pairs SEPnew.

Figure 7:
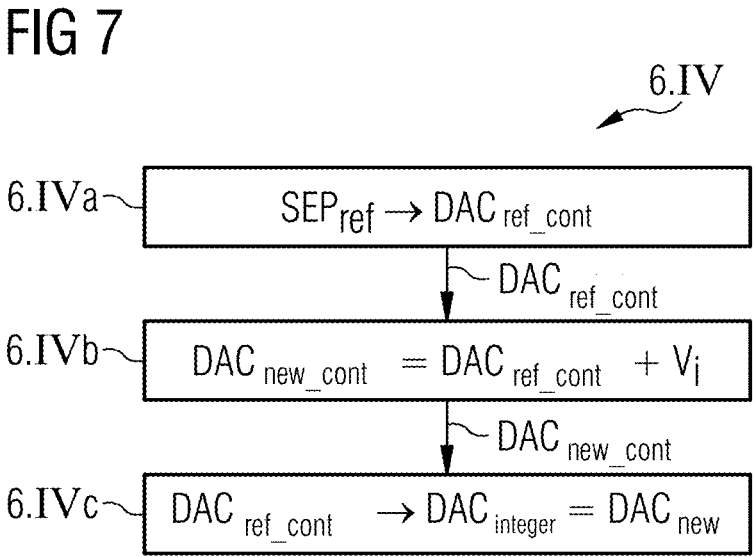
FIG. 7 shows a flowchart which illustrates step 6.IV of the method shown in FIG. 6 according to a first exemplary embodiment of the invention.

FIG. 7 shows a flowchart which illustrates step 6.IV according to a first exemplary embodiment of the invention.

In step 6.IVa, pixel-individual reference signal threshold value-signal energy value pairs SEPref are assigned to a continuous reference signal threshold value scale, so they have continuous reference signal threshold values DACref-_cont.

In step 6.IVb, the ascertained pixel-individual shift value Vi is subsequently added to the continuous reference signal threshold values DACref_cont, with continuous signal threshold values DACnew_cont being generated.

Subsequently in step 6.IVc, recalibrated signal threshold values DACnew are ascertained by respective rounding of the continuous signal threshold values DACnew_cont to an integer signal threshold value DACinteger. These integer recalibrated signal threshold values DACnew are each part of a recalibrated signal threshold value-signal energy value pair SEPnew.

Figure 8:
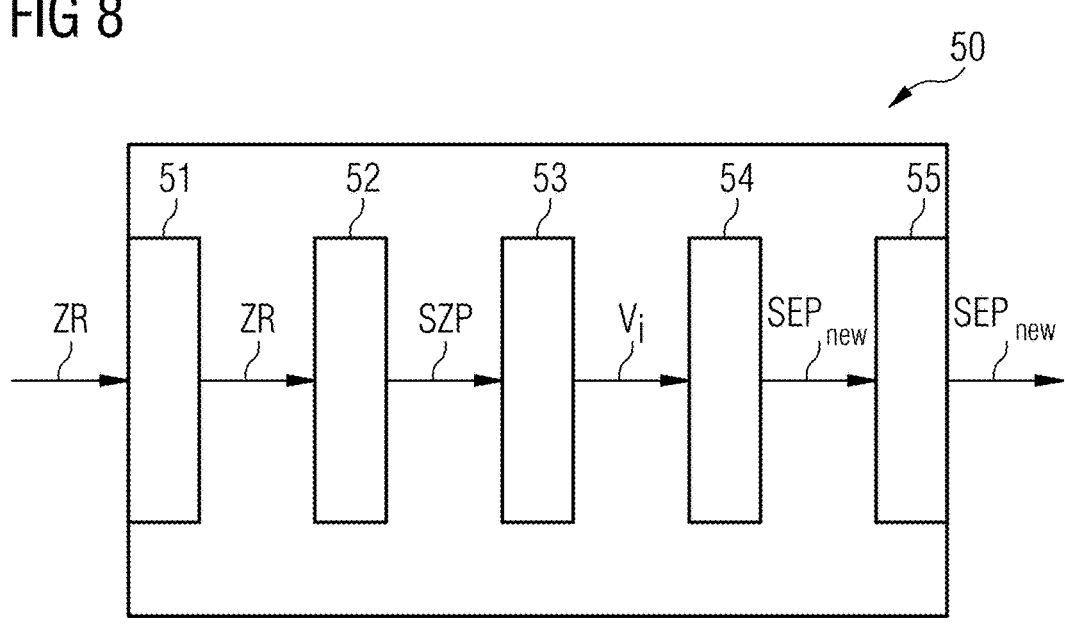
FIG. 8 shows a block diagram which illustrates a calibration facility according to one exemplary embodiment of the invention.

FIG. 8 schematically illustrates a recalibration facility 50 for a radiation detector 1 (see FIG. 9) according to one exemplary embodiment of the invention. The recalibration facility 50 comprises a data receiving interface 51 for receiving a characteristic X-ray spectrum of an X-ray source. A plurality of energy-dependent count rates ZR is measured for different signal threshold values DAC of an evaluation unit of the radiation detector 1 per pixel P of the radiation detector 1.

An assignment unit 52 is part of the recalibration facility 50 and is configured to ascertain updated signal threshold value-count rate pairs SZP by assigning the signal threshold values DAC to spectral count rates ZR on the basis of the characteristic X-ray spectrum.

The recalibration facility 50 also comprises a comparison unit 53 for pixel-wise ascertainment of pixel-individual shift values Vi for the signal threshold values DAC by way of a comparison between the signal threshold value-count rate pairs EZP with pixel-individual reference signal threshold value-count rate pairs SZPref, ascertained at an earlier instant, of a preceding calibration of the radiation detector 1 on the basis of a regression analysis.

The inventive recalibration facility 50 also has a recalibration unit 54 for pixel-wise ascertainment of recalibrated signal threshold value-signal energy value pairs SEPnew by pixel-wise addition of the respective pixel-individual shift value Vi to the signal threshold values DACref of the respective pixel-individual reference signal threshold value-count rate pairs SZPzef of the respective pixel Pi.

The ascertained recalibrated signal threshold value-signal energy value pairs SEPnew are finally transferred to an output interface 55 which outputs this recalibration data SEPnew to a database DB (see FIG. 9) in which one or more calibration table(s) are stored.

Figure 9:
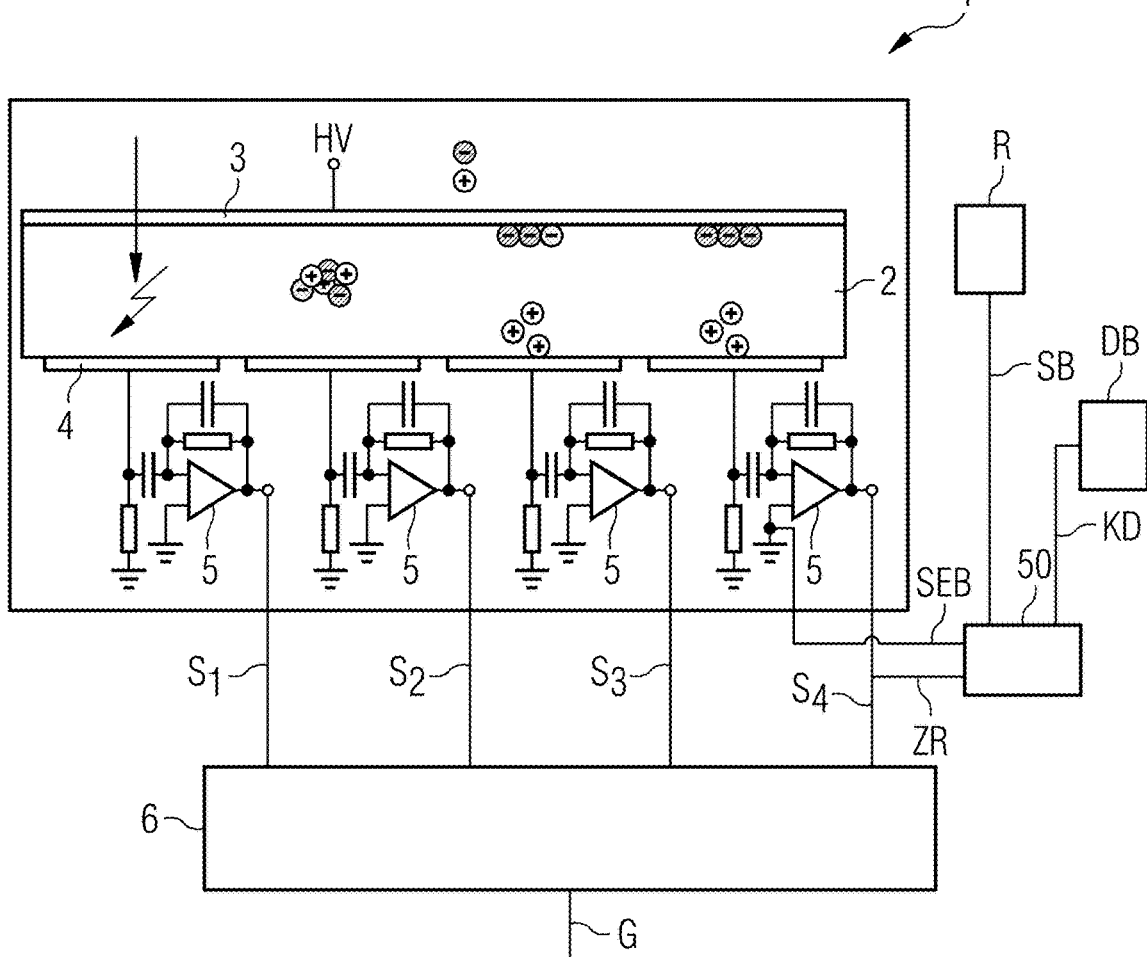
FIG. 9 shows a block diagram, which illustrates an X-ray detector with a calibration facility according to one exemplary embodiment of the invention.

FIG. 9 schematically shows a radiation detector 1 in the form of a semiconductor detector which functions as a direct converter. Such a semiconductor detector 1 is used, for example, in a computed tomograph. The semiconductor detector 1 is embodied as a planar pixel detector. It comprises semiconductor material 2 in the form of a monocrystal as the detector material. The semiconductor material 2 is covered on one side with a metal surface which forms an electric rear-side contact 3. A voltage HV is applied at the rear-side contact 3.

The opposing side of the monocrystal 2 is covered with a structured metallization whose individual sub-areas are embodied as pixel contacts 4 and in their entirety form a pixel matrix. The size and the spacings of the pixel contacts 4, together with further material parameters of the semiconductor material 2, determine the maximum spatial resolution capacity of the semiconductor detector 1. The resolution usually lies in the region of 10 to 500 µm. The individual pixel contacts 4 are each connected to separate readout electronic circuits 5 with which measuring signals s1, s2, s3, s4 are detected. The comparators fitted in the readout electronic circuits 5 may be adjusted with electronic threshold voltages for the detection of particular spectral components of X-ray radiation.

Furthermore, the radiation detector 1 comprises an addition element 6 with which the measuring signals s1, s2, s3, s4 are combined to form a group signal G. The addition element 6 can also carry out a weighting of the individual measuring signals or pixel signals before it adds them. In order to correctly add the individual signals s1, s2, s3, s4, the electronic thresholds of the comparators assigned to them have to be adjusted in such a way that they correspond exactly to the same energy threshold. The recalibration facility 50 shown in FIG. 8 is used for this. During the course of the recalibration method shown in connection with FIG. 6 and FIG. 7 the recalibration facility 50 sends threshold adjustment commands SEB for this purpose to the comparators 5 in order to change their comparator threshold or to finally adjust it and receives measuring signals ZR from the individual comparators 5 (only the signal link to the comparator transmitting a fourth signal s4 is drawn, however signal links are analogously likewise present for the other comparators). Furthermore, the recalibration facility 50 can optionally also actuate an X-ray tube R with the aid of control commands SB during the course of the recalibration, with the X-ray flux being changed accordingly for the individual measurements. This procedure can be expedient if pixels are to be aligned or homogenized. After calibration the ascertained calibration data KD is transferred to a database DB. The calibration data KD can be used, for example, when processing the count rates ZR of the individual pixels in the addition element 6 in order to correctly add the count rates ZR accordingly to the correctly assigned energy values.

It should be noted that the arrangement 1 in FIG. 9 is shown as a cross-section and consequently the arrangement 1 in FIG. 9 comprises a total of 16 pixel contacts. For a better understanding only four pixel contacts per pixel group are drawn in accordance with the cross-sectional view. As already mentioned, 16 or another number of pixel contacts per pixel group are customary.

The semiconductor detector 1 shown in FIG. 9 functions as follows: X-ray radiation striking the semiconductor detector 1 prompts interactions of the X-ray quanta with the semiconductor material 2 of the semiconductor detector 1, with electron-hole pairs being generated. The voltage HV applied to the contacts of the detector 1 generates an electrical field which moves the generated charge carriers in the direction of the electrical contacts, in particular the pixel contacts 4. The charge motion in the sensor material between the electrodes or pixel contacts 4 of the semiconductor detector 1 generates an electric charge pulse which is proportional to the absorbed energy of the X-ray radiation. This charge pulse is read out by the connected readout electronic circuit 5. The pixel signals or measuring signals s1, s2, s3, s4 detected by the readout electronic circuit 5 are forwarded to an addition element 6 which combines the measuring signals s1, s2, s3, s4 (in fact, the measuring signals s1 to s16) to form a single group signal G. The number of four different measuring signals s1, s2, s3, s4 is merely illustrative and can be replaced by any desired number of n measuring signals.

In conclusion, reference should be made to the fact that the features of all exemplary embodiments or developments disclosed in Figures can be used in any desired combination. Finally, reference should likewise be made to the fact that the X-ray detector described above in detail, the X-ray imaging system, the calibration facility and the method for recalibration of a radiation detector are merely exemplary embodiments which can be modified by a person skilled in the art in a wide variety of ways without departing from the field of the invention. For example, the X-ray detector can also be embodied as an annular detector which completely surrounds a measuring room of an imaging system in one direction. Furthermore, use of the indefinite article "a" or "an" does not preclude the relevant features from also being present several times. Similarly, the term "unit" does not preclude the relevant components from being composed of a plurality of cooperating sub-components which can optionally also be spatially distributed. Independent of the grammatical term usage, individuals with male, female or other gender identities are included within the term.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flow-chart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible language), markup (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules.

Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A method for recalibration of a radiation detector with a plurality of pixels, the method comprising:

detecting a radiation spectrum of a radiation source using a radiation detector, the detecting including, measuring a plurality of energy-dependent count rates for different signal threshold values of an evaluation unit of the radiation detector per pixel of the radiation detector, and ascertaining updated signal threshold value-count rate pairs based on the different signal threshold values and the count rates;

pixel-wise ascertaining pixel-individual shift values for the signal threshold values based on a comparison of the updated signal threshold value-count rate pairs with pixel-individual reference signal threshold value-count rate pairs of a preceding calibration of the radiation detector, the pixel-individual reference signal threshold value-count rate pairs being ascertained at an earlier instant;

pixel-wise ascertaining recalibrated signal threshold value-signal energy value pairs based on a pixel-wise addition of the respective pixel-individual shift value to the signal threshold values of respective pixel-individual reference signal threshold value-signal energy value pairs of the respective pixel of the preceding calibration; and recalibrating the radiation detector via the recalibrated signal threshold value-signal energy value pairs.

2. The method of claim 1, wherein the ascertaining pixel-individual shift values ascertains the pixel-individual shift values pixel-wise based on one of the following types of a comparison method:

a regression analysis based on the updated signal threshold value-count rate pairs and the pixel-individual reference signal threshold value-count rate pairs of a preceding calibration of the radiation detector, the pixel-individual reference signal threshold value-count rate pairs are ascertained at an earlier instant, or a method based on artificial intelligence is applied to the updated signal threshold value-count rate pairs and the pixel-individual reference signal threshold value-count rate pairs of a preceding calibration of the radiation detector, the pixel-individual reference signal threshold value-count rate pairs are ascertained at an earlier instant.

3. The method of claim 1, wherein the pixel-wise ascertaining recalibrated signal threshold value-signal energy value pairs includes adding an offset value of each of the pixel-individual shift values each to signal threshold values of respective pixel-individual reference signal threshold value-signal energy value pairs of the respective pixel of the preceding calibration.

4. The method of claim 3, wherein the pixel-individual shift values are each ascertained based on an ascertained function of a higher order than a zeroth order between the signal threshold values of the updated signal threshold value-count rate pairs and the signal threshold values of the reference signal threshold value-count rate pairs.

5. The method of claim 1, wherein the pixel-individual shift values are each ascertained based on an ascertained function of a higher order than a zeroth order between the signal threshold values of the updated signal threshold value-count rate pairs and the signal threshold values of the reference signal threshold value-count rate pairs.

6. The method of claim 1, wherein a plurality of different calibration tables are corrected during the recalibrating via the recalibrated signal threshold value-signal energy value pairs based on the ascertained shift values, the plurality of different calibration tables are based on signal threshold values.

7. The method of claim 1, wherein the pixel-individual reference signal threshold value-count rate pairs are assigned to a continuous reference signal threshold value scale and have continuous reference signal threshold values, the ascertained pixel-individual shift value is added to the continuous reference signal threshold values to generate continuous signal threshold values, and recalibrated signal threshold values of the recalibrated signal threshold value-signal energy value pairs are ascertained by rounding the continuous signal threshold values in each case to an integer signal threshold value.

8. The method of claim 7, wherein the method is executed multiple times at different instants and on each recalibration the continuous signal threshold values are saved and subsequently a trend analysis is carried out based on the continuous signal threshold values ascertained at different instants.

9. The method of claim 1, further comprising:

validating the recalibration based on at least one error criterion, the at least one error criterion being based on a measurement carried out for the recalibration.

10. The method of claim 9, wherein the at least one error criterion comprises at least one of the following types of criteria:

a shift value occurs which overshoots a predetermined threshold value, a number of pixels, for which recalibrated signal threshold value-signal energy value pairs have to be generated, overshoots a predetermined portion of a total number of pixels of the radiation detector, or a number of pixels classified as defective overshoots a predetermined number.

11. The method of claim 9, further comprising:

outputting a warning message when a result of the validating is negative.

12. The method of claim 9, wherein a plurality of different calibration tables are corrected during the recalibrating via the recalibrated signal threshold value-signal energy value pairs based on the ascertained shift values, the plurality of different calibration tables are based on signal threshold values.

13. The method of claim 12, wherein the pixel-individual reference signal threshold value-count rate pairs are assigned to a continuous reference signal threshold value scale and have continuous reference signal threshold values, the ascertained pixel-individual shift value is added to the continuous reference signal threshold values to generate continuous signal threshold values, and recalibrated signal threshold values of the recalibrated signal threshold value-signal energy value pairs are ascertained by rounding the continuous signal threshold values in each case to an integer signal threshold value.

14. A computer program product comprising commands which, when executed by a computer, cause the computer to perform the method of claim 1.

15. A non-transitory computer-readable storage medium comprising commands which, when executed by a computer, cause the computer to perform the method of claim 1.

16. A recalibration facility for a radiation detector, comprising:

a data receiving interface configured to detect a characteristic radiation spectrum of a radiation source using the radiation detector, the data receiving interface being further configured to receive a plurality of energy-dependent count rates for different signal threshold values of an evaluation unit of the radiation detector per pixel of the radiation detector and ascertain updated signal threshold value-count rate pairs based on the different signal threshold values and the count rates;

a comparison unit configured to pixel-wise ascertain pixel-individual shift values for the signal threshold values based on a comparison between the updated signal threshold value-count rate pairs and pixel-individual reference signal threshold value-count rate pairs of a preceding calibration of the radiation detector, the pixel-individual reference signal threshold value-count rate pairs ascertained at an earlier instant; and a recalibration unit configured to pixel-wise ascertain recalibrated signal threshold value-signal energy value pairs by pixel-wise addition of the respective pixel-individual shift value to the signal threshold values of respective pixel-individual reference signal threshold value-signal energy value pairs of the respective pixel of the preceding calibration, the recalibration unit being further configured to recalibrate the radiation detector via the recalibrated signal threshold value-signal energy value pairs.

17. A radiation detector, comprising:

a detection unit configure to generate a detection signal for radiation striking the detection unit;

an evaluation unit configured to ascertain a plurality of energy-dependent count rates for different signal threshold values based on the detection signal; and the recalibration facility of claim 16 configured to recalibrate the radiation detector.

18. An imaging system comprising:

a radiation source; and the radiation detector of claim 17.

19. The radiation detector of claim 17, wherein the radiation is X-ray radiation.

20. The recalibration facility of claim 16, wherein the radiation detector is an X-ray detector.

\* \* \* \* \*